(12) United States Patent
Tervonen

(10) Patent No.: US 6,359,730 B2
(45) Date of Patent: Mar. 19, 2002

(54) AMPLIFICATION OF AN OPTICAL WDM SIGNAL

(75) Inventor: Ari Tervonen, Helsinki (FI)

(73) Assignee: Nokia Network Oy, Espoo (FI)

( * ) Notice: Subject to any disclaimer, the term of this patent is extended or adjusted under 35 U.S.C. 154(b) by 0 days.

(21) Appl. No.: 09/822,957

(22) Filed: Mar. 30, 2001

Related U.S. Application Data

(63) Continuation of application No. PCT/FI99/00862, filed on Oct. 19, 1999.

(30) Foreign Application Priority Data

Oct. 21, 1998 (FI) .................................................. 982273

(51) Int. Cl.[7] .............................................. H01S 3/00
(52) U.S. Cl. ................................. 359/349; 359/341.32
(58) Field of Search ............................. 359/349, 341.3, 359/341.32, 341.33, 333, 344

(56) References Cited

U.S. PATENT DOCUMENTS

| | | | | |
|---|---|---|---|---|
| 5,392,154 A | * | 2/1995 | Chang et al. | 359/341 |
| 5,452,115 A | * | 9/1995 | Kirkby et al. | 359/124 |
| 5,563,733 A | | 10/1996 | Mitsuda et al. | |

FOREIGN PATENT DOCUMENTS

| | | |
|---|---|---|
| DE | 19604438 C1 | 2/1997 |
| EP | 0617527 A1 | 9/1994 |
| EP | 0699927 A1 | 3/1996 |
| EP | 0766358 A1 | 4/1997 |
| WO | WO 98/54861 | 12/1998 |

OTHER PUBLICATIONS

Takahashi et al, "Transmission characteristics of Arrayed Waveguide NxN Wavelength Multiplexer", *Journal of Lightwave Technology*, pp 477–455, Mar. 3, 1995.
Takahashi et al, "Anticrosstalk arrayed–waveguide add––drop multiplexer with foldback paths for penalty free transmission", *Electronics Letters*, pp 2053–2055, Nov., 1994.

* cited by examiner

*Primary Examiner*—Mark Hellner
(74) *Attorney, Agent, or Firm*—Altera Law Group

(57) ABSTRACT

The invention relates to a method for amplifying an optical signal and to an amplifier unit (OFA) to which an optical input signal comprising a plurality of wavelength channel signals each at its dedicated wavelength is supplied. In the method, (a) demultiplexing is carried out to separate each wavelength channel signal from the input signal, (b) a first multiplexing is carried out, combining each separated wavelength channel signal with a separate pump signal, (c) each combination of a wavelength channel signal and pump signal is guided to its dedicated amplifier means (FA1 ... FA4), and (d) the pump signals are separated from the amplified wavelength channel signals obtained from the amplifier means and a second multiplexing is carried out, combining the amplified wavelength channel signals into an outgoing WDM signal. To enable a solution based on several parallel amplifiers to be implemented in a simpler manner than heretofore, the same waveguide phased array component is used for processing both the wavelength channel signals and the pump signals at the output end, input end or both ends of the amplifier unit. For the input end, this means that the demultiplexing of the input signal and the first multiplexing are carried out using the same waveguide phased array component (WGA1).

15 Claims, 4 Drawing Sheets

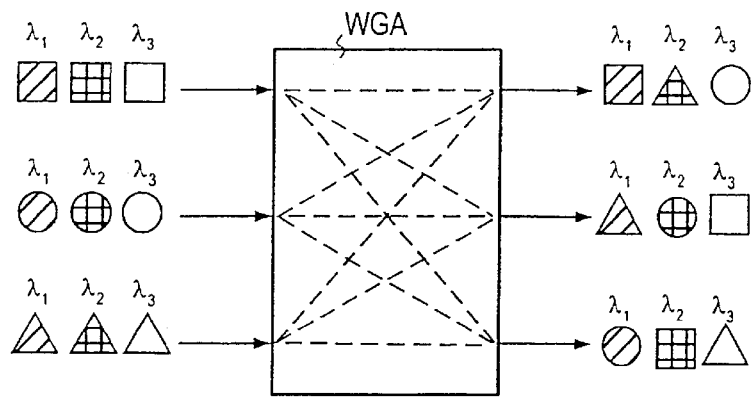
FIG. 3
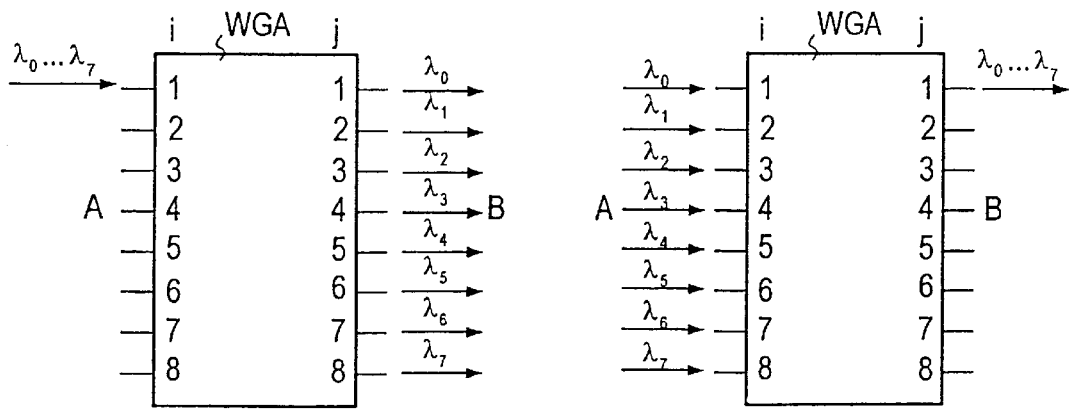
FIG. 4    FIG. 5
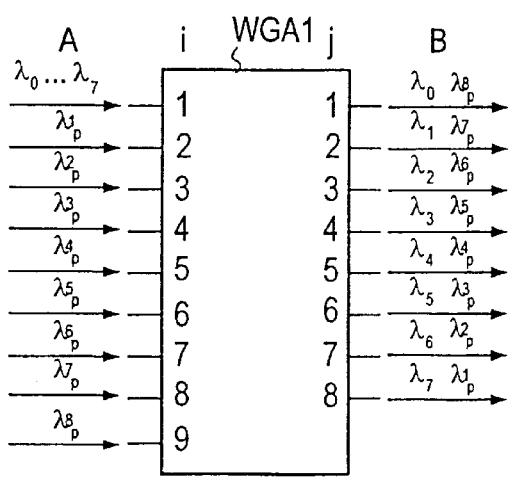
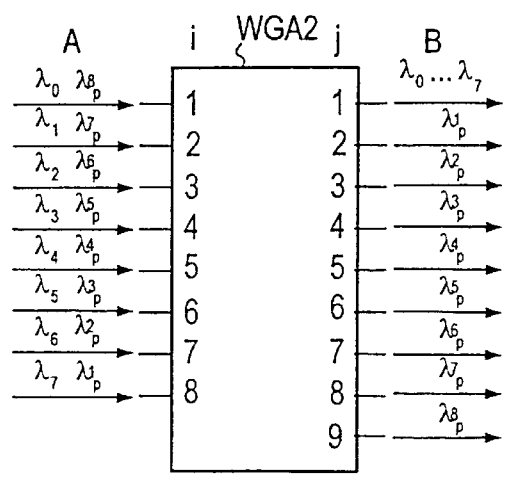
FIG. 6    FIG. 7

1

AMPLIFICATION OF AN OPTICAL WDM SIGNAL

This application is a continuation of PCT/FI99/00862 filed Oct. 19, 1999.

FIELD OF THE INVENTION

The invention relates generally to optical transmission systems using wavelength division multiplexing, WDM, and particularly to an optical amplification unit used therein.

BACKGROUND OF THE INVENTION

In optical transmission systems, an optical signal is modulated with an outbound data stream, and the modulated optical signal is applied to optical fiber. In order to increase the capacity of the system, the bandwidth of the data stream can be increased or more wavelengths can be introduced, each of which is modulated with a discrete data stream. The latter method is termed wavelength division multiplexing.

Wavelength division multiplexing (WDM) is an efficient way of multiplying the capacity of optical fiber. In wavelength division multiplexing, several independent transmitter-receiver pairs use the same fiber. FIGS. 1a and 1b illustrate the principle of wavelength division multiplexing, using as an example a system having four parallel transmitter-receiver pairs. Each of the four information sources (not shown in the figure) modulates one of four optical transmitters, each of which generates light at a different wavelength ($\lambda_1 \ldots \lambda_4$). As will be seen from FIG. 1a, the modulation bandwidth of each source is smaller than the distance between the wavelengths, and thus the spectra of the modulated signals do not overlap. The signals generated by the transmitters are combined onto the same optical fiber OF in a WDM multiplexer WDM1, which is a fully optical (and often passive) component. At the opposite end of the fiber, a WDM demultiplexer WDM2, which is also a fully optical (and often passive) component, separates the different spectral components of the combined signal from one another. Each of these signals is detected at a discrete receiver. Hence, a narrow wavelength window is assigned for the use of each signal in a given wavelength range. A typical practical example might be a system where the signals are in the 1550 nm wavelength range for example in such a way that the first signal is at wavelength 1544 nm, the second signal at wavelength 1548 nm, the third signal at wavelength 1552 nm and the fourth signal at wavelength 1556 nm. Nowadays a multiple of 100 GHz (approx. 0.8 nm) is becoming the de facto standard for the distance between wavelengths.

Erbium-doped fiber amplifier (EDFA) has generally been used as an optical amplifier on optical fiber links, since it combines several good properties, such as an overall simple structure and the availability of reliable and effective pump lasers. In these amplifiers, the amplification takes place in Er-doped fiber (for which the term active fiber will be used hereinafter), but also other kinds of doping have been used when for example amplification in another wavelength range has been desired.

However, such amplifiers are not very suitable as such for implementing WDM links, since their uneven amplification curve places restrictions on the selection of wavelengths. For this reason, amplifiers with a flattened amplification curve are nowadays generally used on WDM links. In other words, the amplification curve must be flattened so that the different wavelengths experience substantially equal amplification. To flatten the amplification curve, either (1) a filter evening out the amplification differences can be incorporated into the EDFA, or (2) the active fiber in the amplifier can be exchanged for fiber having a flatter amplification curve. Such fiber is for example erbium-doped fluoride fiber, for which reason such amplifiers are called erbium-doped fluoride fiber amplifiers, EDFFA.

In such an amplifier that is common to all wavelengths, the entire output power must be divided among all wavelengths, wherefore in practice an upper limit exists for the amplification experienced by each signal, said limit being the lower the more of these signals of different wavelengths the WDM signal contains. Furthermore, a significant drawback in using a filter is that the filter possesses a specific spectral form that has been designed with the assumption that the unevenness of the amplification has a specific format as a function of the wavelength. If the power input to the amplifier deviates from its hypothetical value, also the form of the gain curve (which is dependent on the power) will change, and thus the operation of the filter can become very unfavourable. In view of power consumption, it is also very disadvantageous that the wavelengths experiencing the greatest amplification must be attenuated with the filter.

On the other hand, the practical implementation of EDFFA is very difficult on account of the fact that the amplifier uses fiber material differing considerably from the material used in conventional telecommunications fibers. For this reason, joining the fibers to each other, for example, is very difficult. On account of these difficulties, practical implementations of EDFFA hardly exist. EDFFA has also poorer noise characteristics than EDFA, and EDFFA amplifiers cannot be pumped at different wavelengths like EDFA amplifiers.

An alternative to a single common amplifier is to use a dedicated amplifier for each wavelength of the WDM signal, by means of which the entire output of each amplifier is acquired for the use of the signal concerned. In such an implementation, the WDM signal must first be demultiplexed in order to separate the different wavelengths for amplification. The solution is quite expensive, as it requires—in addition to a demultiplexer and parallel amplifiers—multiplexer means by which the pump signal needed for amplification and each wavelength channel signal in the WDM signal are multiplied onto the fiber of the amplifier corresponding to said wavelength channel signal. (In this context, the term pump signal is used, even though mere optical pump power carrying no data is concerned.)

SUMMARY OF THE INVENTION

It is an object of the invention to eliminate the drawbacks described above and to provide an amplifier solution that is advantageous in view of power utilization and furthermore can be implemented more simply and cost-effectively than heretofore.

This object is achieved with a solution as defined in the independent claims.

The idea of the invention is to use a waveguide phased array component at the output or input end or both ends of the amplifier unit for processing both wavelength channel signals and pump signals. For the input end, for example, this means that the same component is used as a demultiplexer separating the different wavelengths of the WDM signal and also as a multiplexer combining the pump signal with each wavelength channel signal of the WDM signal. The waveguide phased array component (whereof also the term waveguide array grating or arrayed waveguide grating is used) is a known component used in fiber optics and is highly suitable for systems using wavelength division multiplexing for example for the reason that a large number of different wavelengths can be transported therethrough.

By means of the invention, the basic solution of several parallel amplifiers, in which the entire output power of one amplifier is acquired totally for the use of a single wavelength channel signal (wavelength), is considerably simplified, since the processing of the wavelength channel signals contained in the WDM signal and the pump signals can be effectively integrated, so that the internal redundancy of the amplifier unit will be diminished.

On account of the solution in accordance with the invention, a very high amplification can be achieved for each wavelength, or alternatively, if a smaller amplification is sufficient, a very simple amplifier can be used for each signal, which will result in a more cost-effective amplifier unit.

One significant additional advantage of the solution in accordance with the invention is that the amplifier unit can be implemented as a very compact structure, as will be described hereinafter. At best, the solution enables integration of the entire amplifier unit into the same component onto the same substrate).

A further advantage of the invention is that each wavelength channel signal can be easily measured (unlike in a conventional amplifier), which allows wavelength-specific monitoring to be carried out.

BRIEF DESCRIPTION OF THE DRAWINGS

The invention and its preferred embodiments will be described in greater detail in the following with reference to FIGS. 5 . . . 10c in examples in accordance with the accompanying drawings, in which FIG. 3 illustrates the operation of the waveguide phased array component, FIG. 4 illustrates the operation of the waveguide phased array component as a demultiplexer, FIG. 5 illustrates the operation of the waveguide phased array component as a multiplexer, FIGS. 6 and 7 illustrate the use, in accordance with the invention, of the waveguide phased array component.

DETAILED DESCRIPTION OF THE INVENTION

Figure 1A:
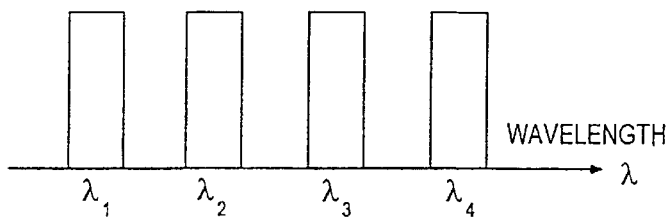
FIGS. 1a and 1b illustrate an optical transmission system using wavelength division multiplexing.
Figure 1B:
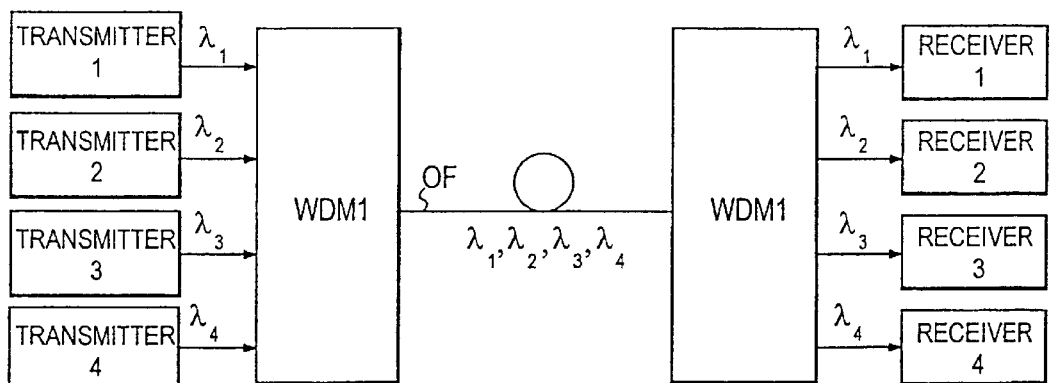
Figure 2:
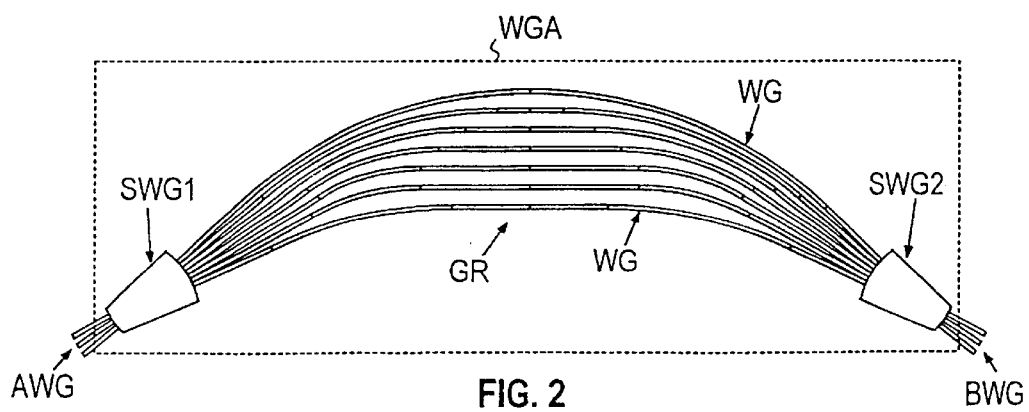
FIG. 2 illustrates the structure of a waveguide phased array component.

As a background for the solution in accordance with the invention, the structure and operation of a waveguide phased array component will first be described with reference to FIGS. 2 . . . 5.

The component (WGA, FIG. 2) comprises N optical input/output guides AWG on the first side of the component, N optical input/output guides BWG on the second side of the component, two slab waveguides SWG1 and SWG2, and a grating GR consisting of optical channel waveguides WG and connecting the slab waveguides, all integrated onto the same substrate. Each side of the component can serve as the input or output side, and thus the waveguides AWG or BWG can be input or output guides. The slab waveguides connecting the input/output waveguides to the separate channel waveguides WG of the grating restrict propagation of light only in the plane perpendicular to the substrate, but allow light propagation in the lateral direction. On the other hand, the channel waveguides WG of the grating prevent light propagation also in the lateral direction. On each side of the slab waveguides, the associated channel waveguides are arranged in the form of a circular arc in such a way that each of them is directed towards the middlemost waveguide in the group of waveguides on the opposite side.

A constant difference in length exists between two adjacent channel waveguides in the grating, the difference in length being a multiple of the center wavelength used. If light is input from the center input/output waveguide of one side at the center wavelength of the component, the light is distributed to all the waveguides of the grating. As the difference in length of the waveguides is a multiple of the center wavelength, all the waves are in the same phase upon arriving in the output slab waveguide whereupon the light is focused to the center output waveguide. In case the wavelength differs from the center wavelength, the wave front arriving in the output is slightly tilted, which means that it is not focused exactly at the center but at another waveguide of the output side. Hence, the component focuses different wavelengths to different outputs, the dimensioning of the component determining which wavelengths are focused on which output. Similarly as the wavelength of the center input waveguide determines which the output waveguide is, the location of the input waveguide determines which the output waveguide is.

The waveguide phased array component thus comprises a number of light channels whose geometry defines that they have both focusing characteristics (a lens) and dispersing characteristics (the wavelength dependency of the grating).

FIG. 3 illustrates the basic operational principle of the component in association with a case in which three different wavelengths ($\lambda_1$, $\lambda_2$, and $\lambda_3$) are used to couple light alternately to each of the three input ports. As the figure shows, the output port of a specific wavelength channel depends both on the wavelength of the channel in question and which the input port of the channel in question is. The component is capable of demultiplexing N wavelength channels received from one input port so that each of the channels goes to a different output port. How the channels are distributed among the output ports depends on which the input port is. Examined from the network point of view, a situation thus exists in which a network element connected to a specific output port and receiving a signal at a specific wavelength knows, based on the output port and the wavelength, from which input port the signal originates.

A symmetrical N×N phased array component has N optical ports on the A side and N optical ports on the B side. The component has been so designed that it multiplexes wavelengths whose separation is $\Delta\lambda$. When optical fibers are connected to the optical ports, light is coupled between each port on the A side and each port on the B side on a wavelength determined from the formula: $\lambda = \lambda_0 + \Delta\lambda(i+j-2)$. In the formula, i stands for the port sequence number on the A side and j for the port sequence number on the B side, and $\lambda_0$ is the wavelength coupling between the ports i=1 and j=1. The wavelength coupled between two ports is the same regardless of whether light is input to the A side port and output from the B side port or in the opposite direction, and the operation of the component is also in other respects symmetric as regards changes of the A and B sides.

The above description is also valid for a component in which the number of optical ports differs on the A side and B side. In such a case, N is the number of ports on the side which has the majority, and the other side may simply be seen as lacking some ports, but the coupling between the ports is nevertheless described by the above formula.

The basic function of the component as a demultiplexer is illustrated as the wavelengths coupling from one A side port to all the B side ports so that a dedicated wavelength is coupled to each of them. This is illustrated in FIG. 4a. For example, when light is input to port i=1, the wavelengths $\lambda=\lambda_0+\Delta\lambda(j-1)$ couple to the output ports. A reverse operation as a multiplexer is obtained when a wavelength is input to each A side port, the wavelengths being selected so that all wavelengths are coupled out of the same B side port. This is illustrated by FIG. 4b. For example, when the wavelength input to each port is $\lambda=\lambda_0+\Delta\lambda(i-1)$, all wavelengths are coupled out of the port j=1.

Generally, the operation of the component is periodic also with respect to wavelength, the period between the wavelengths being the Free Spectral Range (FSR). Consequently, if a coupling exists between two ports at the wavelength $\lambda$, a coupling also exists between them at the wavelengths $\lambda+n\times FSR$, where n is a positive or negative integer. The components used in practice are planned so that FSR is larger than $\Delta\lambda\times N$ because otherwise the same wavelength couples from a specific input port to more than one output port, which is undesirable. A special case is an N×N phased array where FSR equals $\Delta\lambda\times N$ exactly. In such a component, the same N wavelengths $\lambda=\lambda_0$, $\lambda_0+\Delta\lambda$, $\lambda_0+2\Delta\lambda$, . . . , $\lambda_0+(N-1)\Delta\lambda$ from each A side port can each be coupled to a different port on the B side. In this case, the order of such different wavelengths at the ports of side B is different each time the connection takes place from a different port on side A.

The theoretical basis for a waveguide phased array component is described in detail e.g. in *Transmission Characteristics of Arrayed Waveguide N×N Wavelength Multiplexer*, Journal of Lightwave Technology, pp. 447–455, Vol. 13, No. 3 March 1995, wherefrom the interested reader will find more background information. The component can be used in different ways, so that the same component serves simultaneously as a multiplexer and a de-multiplexer for the same set of wavelengths. Two such ways are described in *Anticrosstalk arrayed-waveguide add-drop multiplexer with foldback paths for penalty free transmission*, Electronics Letters, pp. 2053–2055, November 1994, Vol. 30, No. 24. A third way is disclosed in the Applicants' PCT application PCT/FI98/00436 (not available to the public at the time of filing of the present application). Since these ways do not relate to the present invention, however, they will not be described in detail in this context.

In the present invention, the amplification of a WDM signal is implemented with wavelength-specific amplifiers in such a way that the waveguide phased array component is used as a demultiplexer separating the different wavelengths of the WDM signal and as a multiplexer combining the pump signal with the wavelength channel signal at each wavelength. FIG. 6 illustrates this principle. In this case, N+1 ports are in use on the input side and N ports on the output side of the waveguide phased array component, N being the number of wavelengths (wavelength channel signals) contained in the WDM signal. In the present example, N=8. The input fiber of the demultiplexer function, through which the WDM signal arrives at the amplifier, is connected to a port on side A of the waveguide phased array component (in the figure, to port i=1) in such a way that from this set of wavelengths, a dedicated wavelength is connected to each port in use on side B. A pump signal required for amplification, having a wavelength denoted with reference $\lambda_p$ in the figure, is applied to the other ports in use on side A. (Even though the same pump wavelength is applied to all these ports, in the figure each pump wavelength is denoted with an upper index of its own, so that the paths travelled by the different pump signals may be distinguishable in the figure). Each pump signal is connected to its dedicated port on side B, and thus one of the wavelengths of the WDM signal and additionally a pump wavelength are connected to each port in use on side B. Thereafter, each such combination of one wavelength channel signal and pump signal propagates to the active fiber of its dedicated amplifier, said fiber being implemented in the known manner.

Subsequent to the actual amplifiers, the amplifier unit in accordance with the invention has another waveguide phased array component whose operation is reverse to the first one. This is illustrated in FIG. 7. In this case, the component multiplexes the wavelengths contained in the WDM signal, as a result of which they will come out from the same port on the output side (port j=1 in the figure). The pump signal associated with each wavelength channel signal is again separated to its dedicated output port.

Figure 8:
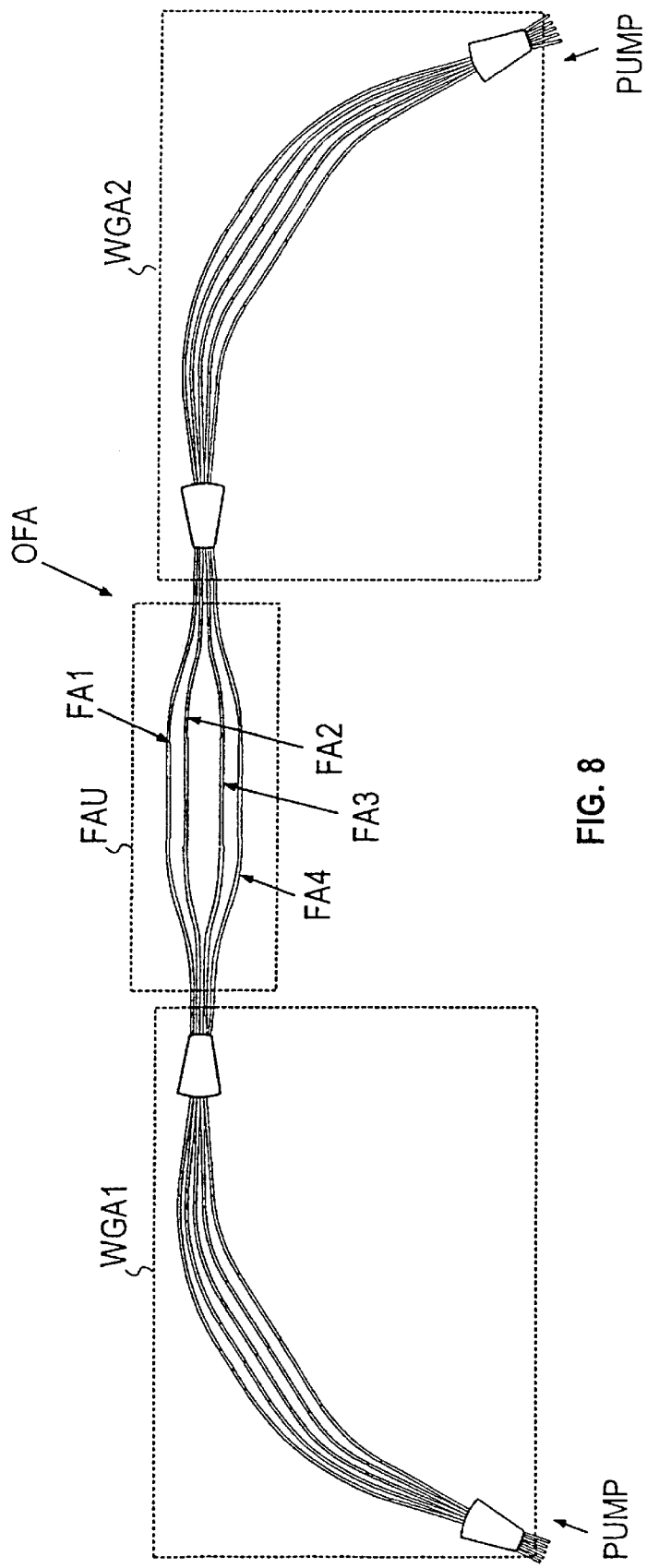
FIG. 8 shows an amplifier unit in accordance with the invention.

FIG. 8 illustrates an optical amplifier unit OFA implemented in the manner described above; in this exemplary case, the amplifier unit is intended for amplification of a WDM signal containing four wavelength channel signals. In accordance with the above, the input side of the amplifier has a first waveguide phased array component WGA1, serving—in accordance with FIG. 6—as a demultiplexer of the WDM signal, simultaneously connecting the pump signal to each wavelength channel signal. This component thus includes an input port for the WDM signal and additionally N=4 input ports for pump signals.

From the first waveguide phased array component, the signals are connected to the actual amplifier part FAU in such a way that each combination of a wavelength channel signal and pump signal is connected to its dedicated active fiber FAi (i=1 . . . 4). These fibers may be for example erbium-doped fibers that are used as the core of a conventional EDFA amplifier, but it is also possible to use other known materials (to which reference was made in the above). Also other amplifier elements than fiber-based elements are possible; what is essential to the amplifier part is that it is implemented with elements to which optical pumping can be applied. (Hence, for example an optical semiconductor amplifier, which requires electrical pumping, cannot be used as the amplifier part.)

After the amplification, the signals propagate to a second waveguide phased array component which operates in accordance with FIG. 7, combining the payload wavelengths to a dedicated output port and separating the pump signals to their dedicated output ports. Thus, the amplifier unit is otherwise conventional, but the same waveguide phased array component is used for demultiplexing the WDM signal and for combining the wavelength channel signals and pump signals. Correspondingly, the same waveguide phased array component is used at the output end for separating the waveguide channel signals and pump signals and for multiplexing the wavelength channel signals.

Both waveguide phased array components are in principle bidirectional, so that they are capable of combining the incoming pump wavelength with the payload wavelengths and also separating the pump signals travelling in the reverse direction to their dedicated ports. The pump signal can thus be applied, except in the forward direction (through component WGA1), also in the reverse direction (through component WGA2) or bidirectionally (through both components). The last alternative will afford the greatest gain. In such a case, the same port that serves as the output port for the pump signal also serves as the input port of the pump signal fed through said end.

Figure 9:
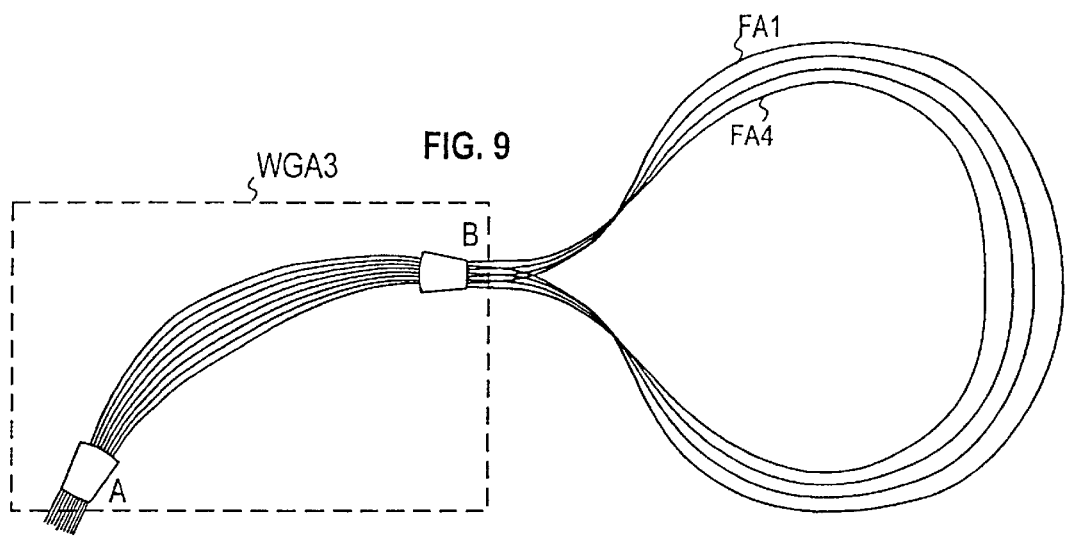
FIG. 9 shows another amplifier unit in accordance with the invention, and FIGS. 10a . . . 10c show different alternatives for supplying a pump signal to the waveguide phased array component.

The operations in accordance with FIGS. 6 and 7 can also be integrated into the same component. Such an alternative is illustrated in FIG. 9, where the WDM signal contains four different wavelengths. The waveguide phased array component, denoted with reference WGA3, thus comprises on the first side—in addition to the input port for the demultiplexer function and the input ports for the pump signals—an output port for the multiplexer function (from which port the amplified WDM signal comes out) and the output ports for the pump signals (a total of N+2 ports). Half of the ports on the second side (N ports) are connected to active fibers, and the remainder of the ports on the second side receive the signals arriving from the active fibers. Thereby, each active fiber FAi passes a loop starting from one port on the second side and ending at another port on the second side.

The pump signal can be supplied to the amplifier fibers at both ends also when, in accordance with FIG. 9, only one waveguide phased array component is used, since in that case the pump signal is applied to the different ports (on side A) in such a way that from some of the ports the pump wavelength propagates in accordance with FIG. 6 to the beginning of the above loops and from some of the ports the pump wavelength is connected to the ports at which said loops end.

Figure 10A:
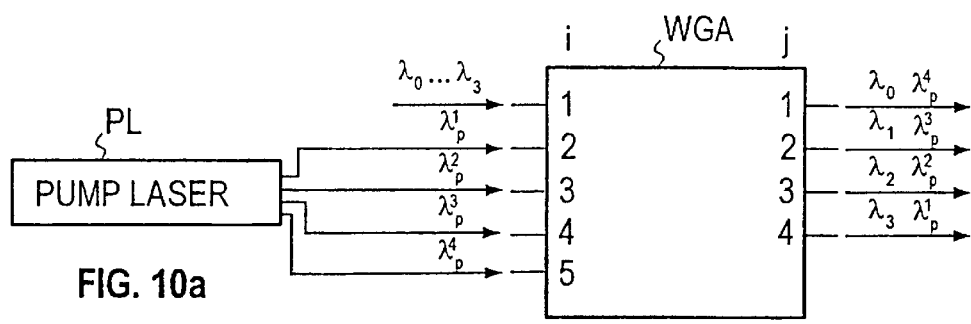
Figure 10B:
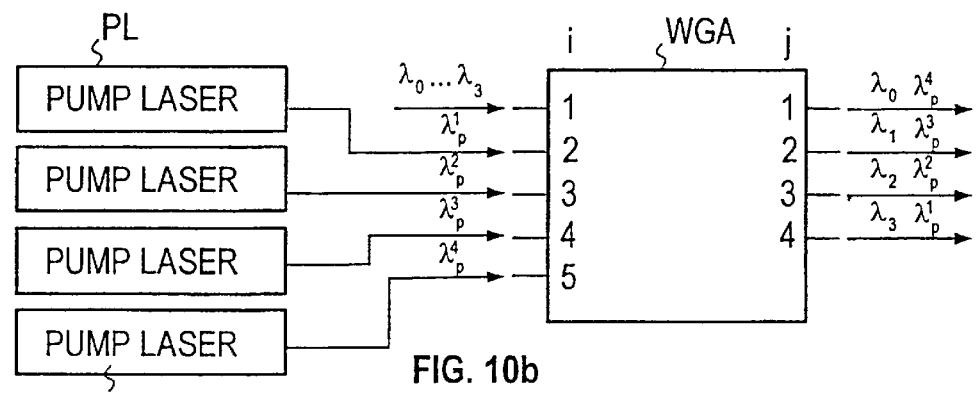
Figure 10C:
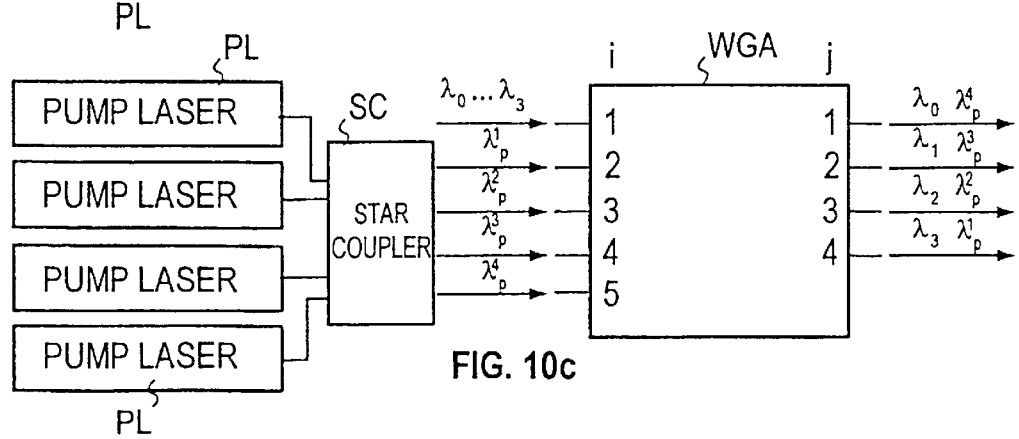

The pump wavelength can be applied to the waveguide phased array component in a variety of ways. FIGS. 10a ... 10c show three different alternatives when it is presumed that the pump signal arrives only in the input direction of the WDM signal. The example of FIG. 10a employs only one pump laser PL whose signal is supplied to all pump inputs of the waveguide phased array component. On the other hand, the example of FIG. 10b has—to improve the reliability—a dedicated pump laser for each pump input, each of said lasers supplying the pump signal directly to the corresponding pump input. Also the example of FIG. 10c has a dedicated pump laser for each pump input, but the outputs of all of these are connected to a star coupler SC, connecting part (in this case, a fourth) of the power of each laser to each of its outputs. The star coupler affords the advantage that when one pump laser is damaged, no wavelength channel signal will be cut off entirely, but ((N-1/N) of the pump power remains in the use of all wavelength channel signals, in this exemplary case e.g. ¾ of the pump power. The number of pump lasers to be connected to the star coupler need not necessarily correspond to the number of pump inputs.

The waveguide phased array components are dimensioned in the known manner and manufactured by a method known per se, such as planar light channel technique, using e.g. doped glass light channels produced on either a silicon wafer or a quartz glass wafer. The component can always be designed to realize the desired functionality. For example, it is to be seen from the above formulae that the pump multiplexing depicted in FIG. 6 is realized when the pump signal from port 2 goes to port 8, in which event the other pump connections shown in the figure will be automatically obtained.

The pump wavelength differs essentially from the amplifier band used by signals; for example with an Er fiber amplifier the pump is normally at 980 nm or 1480 nm, whereas the amplifier band is 1530 . . . 1565 nm. If wavelength channel signal $\lambda_{18}$ is connected from port 1 to port 8, the free spectral range FSR of the component can be selected (irrespective of the selected signal wavelengths) in such a way that the pump wavelength $\lambda_p = \lambda_{18} - n \times FSR$.

An amplifier unit of the kind described above can be constructed in very compact form. As stated above, the waveguide phased array components can be integrated into a single component onto the same silicon wafer or quartz glass wafer, in which case the active fibers are the only parts remaining outside this integrated component. Since, however, it is currently possible to implement optical amplifiers with glass light channel structures as well, parallel light channel amplifiers that can be implemented on the same glass slab can be used instead of parallel active fibers. In this way, the entire amplifier unit can be constructed as a single component. With the evolvement of light channel amplification technology, such a practical implementation will be more cost-effective in the future. Also the (star) coupler intended for distributing the pump output power can be implemented on the same substrate.

In the amplifier unit in accordance with the invention, each wavelength channel signal can easily be measured (unlike in a conventional amplifier) for example by branching off a small portion of the wavelength channel signal of each active fiber to a separate detector, thus allowing wavelength-specific monitoring of the signal. Furthermore, an add-drop multiplexer can be integrated into the amplifier unit, when necessary, by providing dedicated optical switches for each active fiber between the multiplexers.

Since in the solution in accordance with the invention each wavelength channel signal is amplified in a dedicated amplifier means, an isolator can be incorporated into each amplifier means, whereby the propagation direction of each wavelength channel signal can be selected by means of the direction of the isolator. In this way, the amplifier unit can be made bidirectional so that the direction of each wavelength can be freely selected.

Even though the invention has been explained in the foregoing with reference to examples in accordance with the accompanying drawings, it is obvious that the invention is not restricted thereto, but it can be modified within the scope of the inventive idea set forth in the appended claims. For example, the waveguide phased array component can have idle ports or it can be part of a larger component wherewith also other functions are realized. It is also possible to implement the amplifier unit in such a way that a waveguide phased array component is used in accordance with the invention either at the input end or at the output end only, and the reverse end employs a conventional technique for combining and separating the signals. In that case, however, some of the advantages of the invention are lost. It is also possible that some of the wavelength channel signals use the same amplifier element, and thus the number of elements need not necessarily correspond to the number of wavelength channel signals.

What is claimed is:

1. A method for amplifying an optical signal, the method comprising the steps of applying an optical input signal comprising a plurality of wavelength channel signals each at its dedicated wavelength to an optical amplifier unit (OFA), demultiplexing the input signal for separating each wavelength channel signal from the input signal, performing a first multiplexing for combining each separated wavelength channel signal with a separate pump signal, guiding each combination of a wavelength channel signal and pump signal to its dedicated amplifier means (FA1 . . . FA4), separating the pump signals from the amplified wavelength channel signals obtained from the amplifier means and performing a second multiplexing for combining the amplified wavelength channel signals into an outgoing WDM signal, characterized by performing the demultiplexing of the input signal and the first multiplexing by means of a first waveguide phased array component (WGA1; WGA3).

2. A method as claimed in claim 1, characterized in that the separation of the pump signals from the amplified wavelength channel signals and the second multiplexing are carried out using a second waveguide phased array component (WGA2; WGA3).

3. A method as claimed in claim 2, characterized in that the first and second waveguide phased array component are the same component (WGA3).

4. A method as claimed in claim 2, characterized in that the pump signals are applied to the amplifier means from two different directions.

5. A method as claimed in claim 4, characterized in that the first and second waveguide phased array component are different components (WGA1, WGA2), and that the pump signal is supplied to both waveguide phased array components.

6. A method as claimed in claim 1, characterized in that the pump signal obtained from one source (PL) is divided into separate pump signals that are supplied to at least one waveguide phased array component.

7. A method as claimed in claim 1, characterized in that the pump signals are supplied from several different sources (PL) to at least one waveguide phased array component.

8. A method as claimed in claim 7, characterized in that the pump signals are supplied through a star coupler (SC).

9. A method for amplifying an optical signal, the method comprising the steps of applying an optical input signal comprising a plurality of wavelength channel signals each at its dedicated wavelength to an optical amplifier unit (OFA), demultiplexing the input signal for separating each wavelength channel signal from the input signal, performing a first multiplexing for combining each separated wavelength channel signal with a separate pump signal, guiding each combination of a wavelength channel signal and pump signal to its dedicated amplifier means (FA1 . . . FA4), separating the pump signals from the amplified wavelength channel signals obtained from the amplifier means and performing a second multiplexing for combining the amplified wavelength channel signals into an outgoing WDM signal, characterized by performing at least said separation of pump signals and said second multiplexing by means of the same waveguide phased array component (WGA2).

10. An optical amplifier unit for amplifying an optical WDM signal, said signal comprising a plurality of different wavelength channel signals at different wavelengths, said amplifier unit (OFA) comprising separate amplifier means (FA1 . . . FA4) for each wavelength channel signal, at least one pump signal source (PL) for generating a pump signal, an input port for receiving said WDM signal, first demultiplexer means for demultiplexing the signal supplied to the input port into separate wavelength channel signals, first multiplexer means for multiplexing the pump signal with each wavelength channel signal, second demultiplexer means for separating the pump signals from the wavelength channel signals, and second multiplexer means for multiplexing the amplified wavelength channel signals after an amplification performed, characterized in that the first demultiplexer means and the first multiplexer means are implemented with a first waveguide phased array component (WGA1; WGA3).

11. An amplifier unit as claimed in claim 10, characterized in that the second demultiplexer means and the second multiplexer means are implemented with a second waveguide phased array component (WGA2; WGA3).

12. An amplifier unit as claimed in claim 11, characterized in that the first and second waveguide phased array component are the same component (WGA3).

13. An amplifier unit as claimed in claim 10, characterized in that a separate pump signal source (PL) is provided for each separate amplifier means.

14. An amplifier unit as claimed in claim 13, characterized in that the pump signal sources are connected through a common star coupler to the waveguide phased array component.

15. An optical amplifier unit for amplifying an optical WDM signal, said signal comprising a plurality of different wavelength channel signals at different wavelengths, said amplifier unit comprising separate amplifier means (FA1 . . . FA4) for each wavelength channel signal, at least one pump signal source (PL) for generating a pump signal, an input port for receiving said WDM signal, first demultiplexer means for demultiplexing the signal supplied to the input port into separate wavelength channel signals, first multiplexing means for multiplexing the pump signal with each wavelength channel signal, second demultiplexer means for separating the pump signals from the wavelength channel signals, and second multiplexer means for multiplexing the amplified wavelength channel signals after an amplification performed, characterized in that the second demultiplexer means and the second multiplexer means are implemented with the same waveguide phased array component (WGA2).

* * * * *